United States Patent [19]
Blume

[11] 3,881,427
[45] May 6, 1975

[54] MONORAIL CAR AND WHEEL ASSEMBLY

[76] Inventor: Lowell R. Blume, 1902 Mallard, Houston, Tex. 77043

[22] Filed: Dec. 3, 1973

[21] Appl. No.: 421,287

[52] U.S. Cl.................. 105/141; 105/145; 104/120
[51] Int. Cl............................................ B61b 13/04
[58] Field of Search.......... 104/242, 118, 120, 247; 105/141, 144, 145, 96.2, 215 R

[56] References Cited
UNITED STATES PATENTS

| | | | |
|---|---|---|---|
| 2,468,158 | 4/1949 | Bartholomew | 105/215 R X |
| 2,875,871 | 3/1959 | Govan et al. | 105/96.2 X |
| 3,338,182 | 8/1967 | Maestrelli | 104/247 |
| 3,426,703 | 2/1969 | Morris | 104/120 X |
| 3,589,302 | 6/1971 | Usani | 105/144 X |

Primary Examiner—M. Henson Wood, Jr.
Assistant Examiner—John J. Love

[57] ABSTRACT

Articulated wheel assemblies for a monorail car are located at the four corners of a car unit. Each wheel assembly has a spring-loaded supporting truck wheel journaled about a horizontal axis in a wheel base and a vertical intersecting pivot axis. Guide wheels are journaled about vertical axes and disposed to one side of the pivot axis and fore and aft of the truck wheel. The guide wheels of a wheel assembly are adapted to engage a centrally located monorail guide rail. The guide wheels provide direction steering for the associated truck wheel. Each drive wheel assembly has a separate hydraulic motor for driving each drive wheel and controlling the braking function.

5 Claims, 9 Drawing Figures

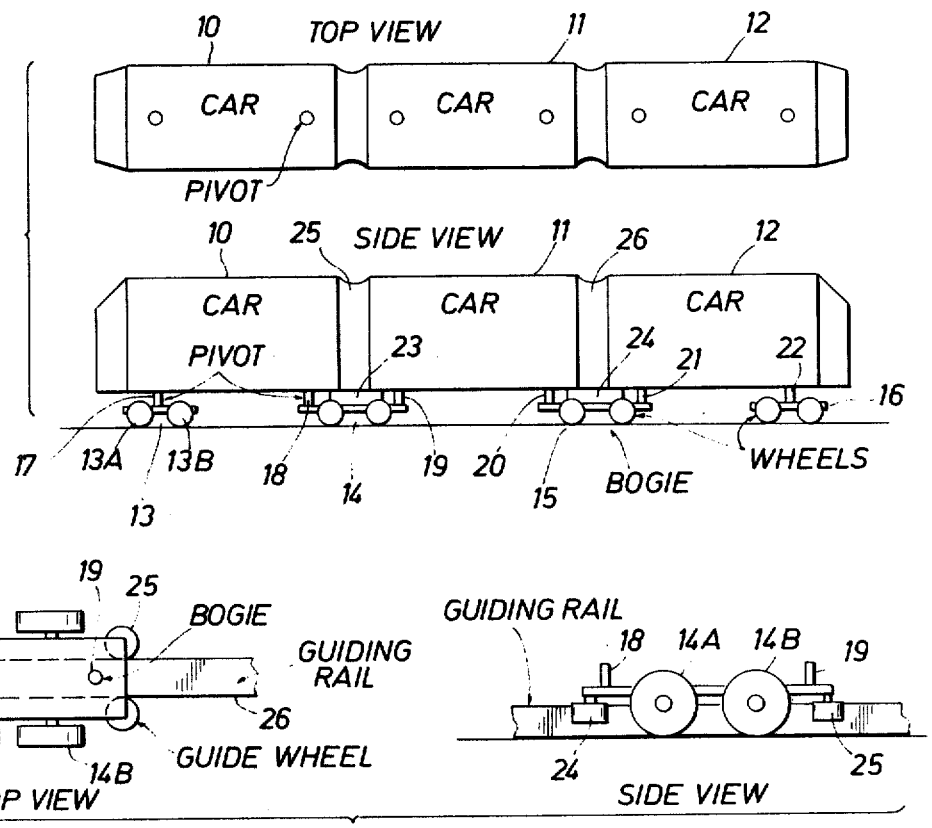
FIG. 1 PRIOR ART
FIG. 2 PRIOR ART
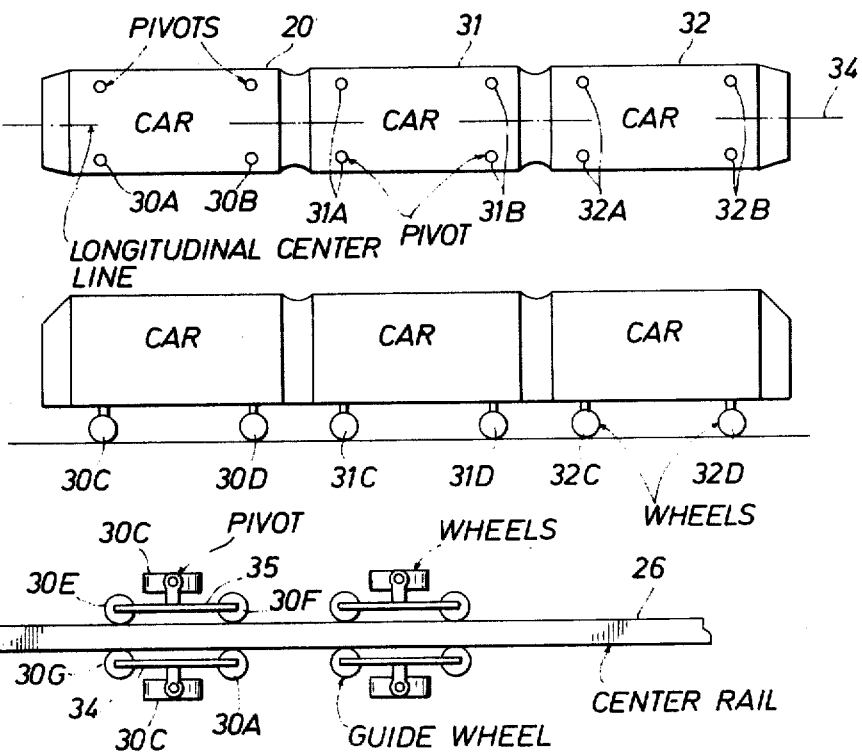
FIG. 3
FIG. 4

MONORAIL CAR AND WHEEL ASSEMBLY

BACKGROUND OF THE INVENTION

This invention relates to monorail wheel assemblies, and more particularly to monorail wheel assemblies which are independently articulated and support the four corners of a car. Each of the truck wheels is independently guided relative to a center guide rail and independently driven and braked.

Heretofore, monorail cars have used truck assemblies which have spaced pairs of vertically journaled guide wheels engageable with an upstanding monorail center guide rib and have spaced pairs of horizontally journaled supporting wheels. The frame for the truck assembly has a forward and rearward vertically extending stud to provide pivotal connections with forward and rearward cars. The studs are located along a longitudinally extending center line and when connected to the car assemblies, the car assemblies have a tendency to rock or tilt from side to side with respect to the longitudinal center line. The supporting wheels are journaled on non-pivoting axels so that when the assembly negotiates a curve, the supporting wheels are not turned but rather are snubbed or forced through each turn thus resulting in severe wear problems for the wheels. For reference to a typical system, reference may be made to U.S. Pat. No. 3,602,152.

BRIEF DESCRIPTION OF THE DRAWINGS

Further advantages of the invention will become apparent from the following description and claims, and from the accompanying drawings, wherein:

FIG. 1 is a top and side view of a train and truck assembly of the prior art;

FIG. 2 is a top and side view of a truck assembly of the prior art;

FIG. 3 is a top and side view of a train and wheel assembly of the present invention;

FIG. 4 is a top view of the wheel assemblies for the present invention;

BRIEF DESCRIPTION OF THE INVENTION

Figure 5:
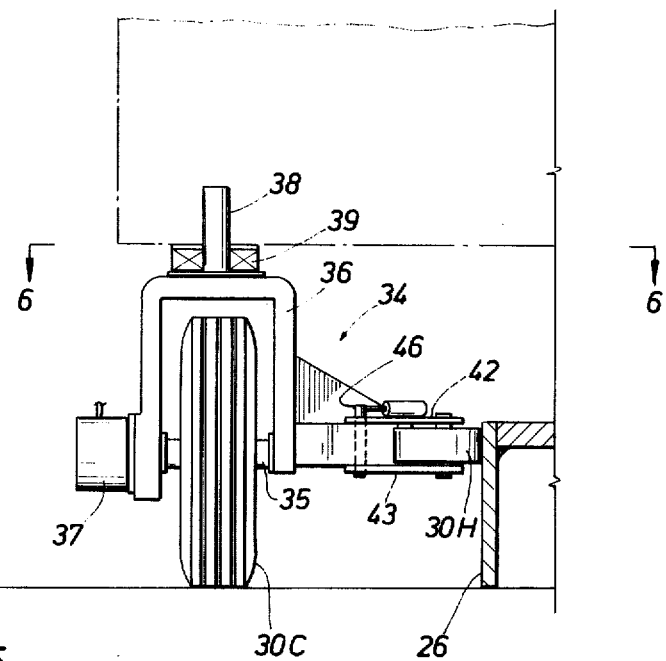
FIG. 5 is a front view of wheel assembly of the present invention.

FIGS. 1 and 2 of the drawings illustrate the prior art construction commonly used, and is disclosed herein for better understanding of the present invention. As shown in FIG. 1, a typical train assembly includes three independent car units 10, 11 and 12 which are basically supported by truck assemblies or "bogies" 13, 14, 15 and 16. Vertical pivots 17–22 are disposed along the longitudinal center line of the truck assemblies and are received in pivot connections in the car units. Driving means 23 and 24 are located on the inner truck assemblies and provide a mechanical drive to the wheels which is driven by electrical motors. Flexible canvas covers 25 and 26 can be used to enclose the power works.

Each car unit of the prior art construction has a forward and rearward pivot connection along the center line of the car. The forward car 10 is supported at its forward terminal end by a truck assembly having a spaced pair of wheels 13a and 13b and a single pivot pin 17 while the rearward car 12 is supported at its rearward end by a truck assembly 16 having a spaced pair of wheels and a single pivot pin 22. Coupling of adjacent car units is accomplished by a truck assembly having a driving means and two pivot pins spaced from one another along a center line of the truck assembly. For example, the truck assembly 14 has forward and rearward pivot pins 18 and 19 on a longitudinal center line which are respectively pivotally coupled to adjacent car members 10 and 11. Because the cars are supported along the longitudinal center line of the units, it is readily apparent that they have a tendency to sway with respect to the center line of the cars.

As shown in FIG. 2, a truck assembly 14 typically includes a spaced pair of wheel sets 14a and 14b which are journaled along horizontal axis in the assembly in such a manner that there is no turning of the wheels or horizontal axis of the wheels with respect to the truck assembly. At the forward and rearward ends of the truck assembly are inwardly extending sets of guide wheels 24 and 25 which engage a center guiding rail 26. The guide wheels are pivoted about vertical axis and engage a center rib or rail. In the operation of this system, as the cars are moved, the sets of guide wheels 24 and 25 follow the center guiding rail 26 and perform the function of steering the truck assembly. In the steering of the truck assembly with the tandum sets of supporting wheels 14a and 14b, it is obvious that the supporting wheels do not turn when this center rail curves and instead are dragged through the arc of the center rail curve by the guide wheels.

Referring now to FIG. 3, in the present invention, each car 30, 31 and 32 is respectively provided with a pair of forward and rearward pivot bushings 30a and 30b, 31a and 31b, and 32a and 32b. Each pair of pivot bushings are disposed to either side of the center line 34 of the train. Each car is respectively provided with a pair of forward and rearward sets of wheels 30c and 30b, 31c and 31d, and 32c and 32d. Each of the wheels are received in a pivot bushing and journaled therein for pivoting about a vertical axis. Thus, each car is supported by four wheels disposed on either side of a center line of a car. A steady support is thereby provided for each car which eliminates any tendency of a car to sway or rock with respect to its center line.

As illustrated in FIG. 4, in a set of supporting wheels 30c, each supporting wheel 30c is respectively attached to an inwardly extending frame 34 or 35 which has a "T" configuration in a horizontal plane. Each wheel 30c rotates about a horizontal axis and each frame 34 or 35 has a pivot along a vertical axis which intersects the horizontal axis through the supporting wheel. The frame 34 is provided with a pair of spaced apart guide wheels 30g and 30h which are journaled about vertical axes and engage the center rail. The frame 35 is provided with spaced apart guide wheels 30e and 30f which are journaled about vertical axis and engage the center rail. The pair of guide wheels provided for each supporting wheel are disposed fore and aft of a support wheel. Hence, if the center rail curves, then the guide wheels will follow the curvature of the center rail and, accordingly, pivot or turn the supporting wheel in accord with the degree of curvature.

In the FIG. 5, a typical wheel assembly is illustrated where a rubber tired pneumatic wheel 30c has a horizontal axle 35 rotatably journaled in a yoke 36. The outer leg of the yoke 36 has an attached hydraulic motor 37 which has a driver shaft coupled to the axle 35 for driving purposes. The upper cross plate of the yoke 36 has a vertical pivot pin 38 and a rotatable bearing means 39. A socket (not shown) for the pivot pin 38 is in the car unit or a boltster. With this arrangement, a supporting wheel is pivotally supported by a pin 38 about a vertical axis with respect to a car unit. The inner leg of the wheel yoke 36 has an inwardly extending, horizontally disposed frame assembly which carries forward and rearward guide rollers 30g and 30h. The guide rollers 30g and 30h are suitably journaled about vertical axes disposed in recesses in the frame assembly. The guide rollers 30g and 30h are arranged to engage the center rail 26 to maintain the line of travel of the wheel 30c parallel to the side guiding surface of the center rail 26.

Figure 6:
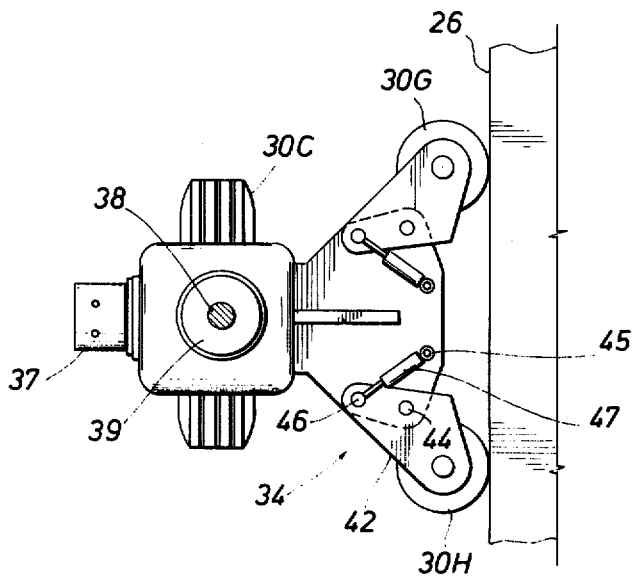
FIG. 6 is a top view taken along line 6—6 of FIG. 5.

The vertical pivot pins for the guide rollers 30g and 30h are respectively attached to upper and lower plate members 42 and 43 (FIG. 5). The plate members 42 and 43 are pivotally connected by a pin 44 (FIG. 6) to a central plate member 45 at an intermediate location of the plate members 42 and 43. At the other end of the plate members 42 and 43, a pivot pin 46 attaches to an adjustable tie rod 47 which is also attached to the plate member 45. A tie rod 47 is used to adjust the compression of the guide wheel on the center rail 26.

Figure 7:
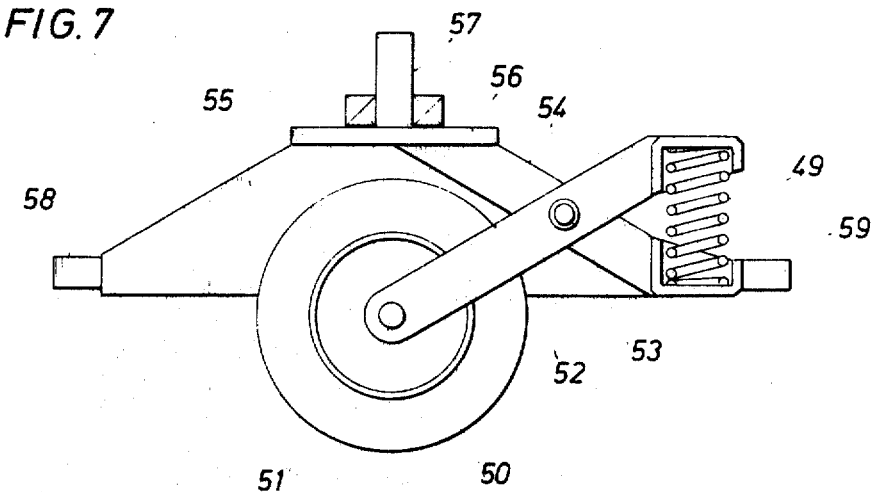
FIG. 7 is a side view of a wheel assembly of the present invention illustrating a spring support.
Figure 8:
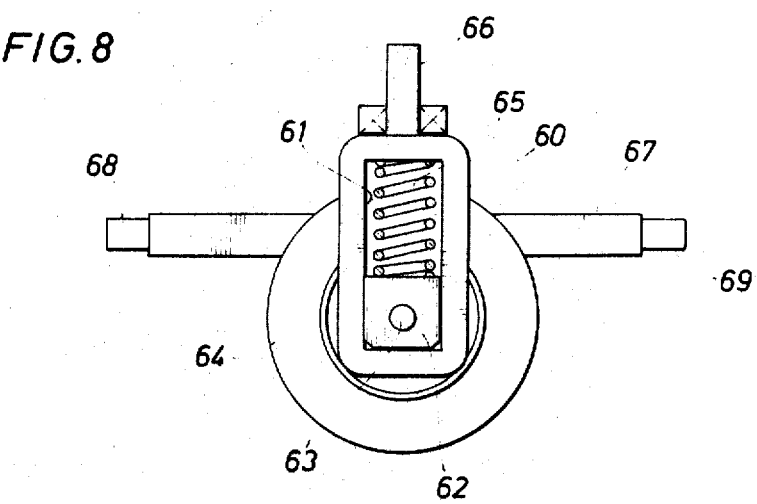
FIG. 8 is a side view of a wheel assembly of the present invention illustrating another form of spring support.

Referring now to FIGS. 7 and 8, spring systems for providing a resilient suspension means are illustrated. In FIG. 7, a supporting wheel 50 is journaled at 51 between a pair of supporting arms 52 (only one shown). Intermediate of their length the supporting arms 52 are pivotally connected at 53 to a forward supporting arm 54 and a rearward plate 55. At the ends of arms 52 and the end of arm 54 a base (not shown) is provided to receive a compression spring 56. The arm 54 and plate 55 are attached to a horizontal plate 56 which carries a vertical pivot pin 57. The axis of the pivot pin 57 intersects the horizontal axis of the supporting wheel 50. Forward and rearward guide wheels 58 and 59 on vertical axis are carried by the rearward plate 55 and provide guiding for the wheel 50.

In FIG. 8, a yoke member 60 is illustrated where each downwardly extending leg of the yoke member has a bearing guide opening 61. Received in each of the openings 61 for vertical movement are bearing members 62 which journal the axel 63 for a supporting wheel 64. Compression springs 65 in each of the openings 61 provide a spring suspension for the wheel 64 with respect to the yoke 60. The horizontal portion of the yoke 60 is provided with a vertical pivot pin 66 which has its axis aligned with the horizontal axis of the wheel. The inner leg of the yoke 60 carries a horizontal frame member 67 which journals the forward and rearward guide wheels 68 and 69.

The journal 35 of the supporting wheel 30c is attached to a hydraulic motor 37. The hydraulic motor provides for an independent drive of the wheel and may, for example, be a motor as is available from the Hydraquip Corporation of Houston, Tex.

Figure 9:
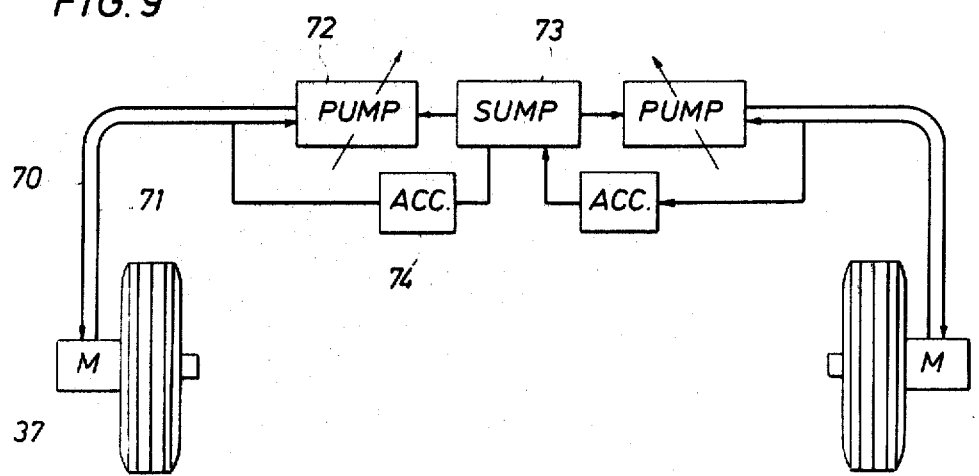
FIG. 9 is a schematic representation of the driving system for the wheel assembly of the present invention.

As shown in FIG. 9, the hydraulic motor 37 has input and output hydraulic lines 70 and 71 connected to a variable displacement hydraulic pump 72. The pump 72 and motor are in an essentially closed loop system where the control of the pump 72 controls the speed of the motor 37. A sump 73 and accumulator 74 are provided for each pump and motor system for each wheel. The pump 72 is driven by an electrical motor to develope the pump pressure for the system. Control of the pump pressure to the motor 37 controls the speed of the motor 37. For example, increasing the pressure to the motor causes acceleration. Decreasing the pressure to the motor causes deacceleration and a hydraulic braking function. This is because there is a back pressure built up in the return line 71. Thus, the closed loop system provides a positive driving and braking control for each wheel.

From the foregoing description, it will be readily apparent that because of the universal connection of each wheel assembly, each wheel is independently controlled by guide wheels relative to a central track. The independent steering enables each wheel to make contact on its tracking circumference. By means of a four point car unit support, sway of the car unit is eliminated. The use of hydraulic motive means for the wheels greatly simplifies the controls and necessary to control equipment and operate a train and also provides for braking function. It is not necessary, of course, to have four wheels for each car. For example, a trailer hitch connection can be made using only one pair of wheels between adjacent cars.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A monorail car assembly for operation on a road surface extending from either side of a central monorail having parallel vertical guiding surfaces wherein said central monorail has a short radius of curvature in curved sections, said car assembly comprising elongated car body means having a longitudinal center line, at least one pair of supporting wheels where each of the supporting wheels are located at opposite sides of said center line at one end of said car body means, means individually journaling each of said supporting wheels for rotation about a horizontal axis, means on each of said journaling means for individually providing a pivot connection along a first vertical axis of rotation, said first vertical axis intersecting a respective horizontal axis of a supporting wheel, said pivot connection for each supporting wheel being free to pivot independently of the pivot function of said other supporting wheels, a pair of guide wheels for each of said supporting wheels, guide frame means on each of said individual journaling means for journaling each of said pairs of guide wheels for rotation about a vertical axis, each pair of said guide wheels being located relative to a supporting wheel in a plane to one side of a first vertical axis and disposed fore and aft of such vertical axis, each said pair of guide wheels being engageable with a vertical guiding surface of a monorail thereby to permit tracking of each such supporting wheel independently of one another relative to said central monorail.

2. The car assembly as defined in claim 1 and further including another pair of supporting wheels where each of the supporting wheels are located at opposite sides of said center line at the other end of said car body means, means for individually journaling each of said other supporting wheels for rotation about a horizontal axis, means on each of said journaling means for individually providing a pivot connection along a first vertical axis of rotation, said first vertical axis intersecting the respective horizontal axis of another supporting wheel, a pair of guide wheels for each of said other supporting wheels, guide frame means on each of said other independent journaling means for journaling each of said pairs of guide wheels for rotation about a vertical axis, each pair of said guide wheels being located relative to another supporting wheel in a plane to one side of a first vertical axis and disposed fore and aft of such vertical axis, each said pair of guide wheels being engageable with a vertical guiding surface of a monorail thereby to permit tracking of each such supporting wheel independently of one another relative to said central monorail, means coupled between a journaling means and a guide frame means for providing a predetermined force to urge said guide wheels against a monorail guide rib, and resilient suspension means on each of said independent journaling means for providing independent suspensions for each of said supporting wheels.

3. The car assembly as defined in claim 1 and further including resilient suspension means on each of said independent journaling means for providing independent suspensions for each of said supporting wheels.

4. The car assembly as defined in claim 3 and further including hydraulic drive means for each of said supporting wheels, said hydraulic drive means being directly coupled to the journal of a supporting wheel and including a closed loop hydraulic system for driving such supporting wheel.

5. A monorail car assembly for operation on a road surface extending from either side of a central monorail having parallel vertical guiding surfaces wherein said central monorail has a short radius of curvature in curved sections, said car assembly comprising car body means having a longitudinal center line, at least two of supporting wheels located at one end of said car body means, said supporting wheels being disposed to either side of said longitudinal center line, independent means journaling each of said supporting wheels for rotation about a horizontal axis, means on each of said journaling means for providing a pivot connection along a first vertical axis of rotation which intersects a respective horizontal axis of a supporting wheel, a pair of guide wheels for each of said supporting wheels, guide frame means for each of said independent journaling means for journaling each of said pairs of guide wheels for rotation about a vertical axis, each pair of said guide wheels being located relative to a supporting wheel for pivoting each of said journaling means and said supporting wheels about said first vertical axis, each of said guide wheels being located relative to a supporting wheel between a first vertical axis and said center line and engageable with said central monorail for tracking of each of said supporting wheels relative to said central monorail, means on said journaling means for adjustably urging said guide wheels into frictional contact with said monorail, resilient suspension means on each of said journaling means for providing independent suspensions for each of said supporting wheels, and hydraulic drive means for each of said supporting wheels, said hydraulic drive means being directly coupled to the journal of a supporting wheel and including a closed loop hydraulic system for driving such supporting wheel.

* * * * *